US007698049B2

(12) United States Patent
Whitney et al.

(10) Patent No.: US 7,698,049 B2
(45) Date of Patent: Apr. 13, 2010

(54) SPEED CONTROL IN A TORQUE-BASED SYSTEM

(75) Inventors: Christopher E. Whitney, Highland, MI (US); Ning Jin, Novi, MI (US); Todd R. Shupe, Milford, MI (US); Weixin Yan, Novi, MI (US); Michael Livshiz, Ann Arbor, MI (US); Klaus Pochner, Russeisheim (DE)

(73) Assignee: GM Global Technology Operations, Inc.

( * ) Notice: Subject to any disclaimer, the term of this patent is extended or adjusted under 35 U.S.C. 154(b) by 11 days.

(21) Appl. No.: 12/327,088

(22) Filed: Dec. 3, 2008

(65) Prior Publication Data

US 2009/0173314 A1 Jul. 9, 2009

Related U.S. Application Data

(60) Provisional application No. 61/019,945, filed on Jan. 9, 2008.

(51) Int. Cl.
*B60T 7/12* (2006.01)
*G05D 1/00* (2006.01)
*G06F 7/00* (2006.01)
*G06F 17/00* (2006.01)

(52) U.S. Cl. ........................ 701/103; 701/110; 123/350

(58) Field of Classification Search ................. 123/350, 123/399; 701/101, 102, 103, 110, 115
See application file for complete search history.

(56) References Cited

U.S. PATENT DOCUMENTS

| | | | | | |
|---|---|---|---|---|---|
| 4,971,011 | A * | 11/1990 | Nanyoshi et al. | ............ | 123/350 |
| 5,988,141 | A * | 11/1999 | Uchida | ...................... | 123/436 |
| 6,006,724 | A * | 12/1999 | Takahashi et al. | ........... | 701/110 |
| 6,155,230 | A * | 12/2000 | Iwano et al. | ........... | 123/339.16 |
| 6,178,371 | B1 * | 1/2001 | Light et al. | ................. | 701/110 |
| 6,425,373 | B1 * | 7/2002 | Robichaux et al. | .......... | 701/103 |
| 6,553,958 | B1 * | 4/2003 | Kolmanovsky et al. | ..... | 123/352 |
| 6,705,285 | B2 * | 3/2004 | Yip et al. | .................... | 123/350 |
| 6,959,691 | B2 * | 11/2005 | Ueda et al. | .................. | 701/110 |
| 6,966,287 | B1 * | 11/2005 | Livshiz et al. | ............... | 123/399 |
| 7,004,144 | B2 * | 2/2006 | Stroh et al. | ................. | 123/399 |
| 2001/0037793 | A1 * | 11/2001 | Robichaux et al. | .......... | 123/350 |
| 2003/0075147 | A1 * | 4/2003 | Kowatari et al. | ............ | 123/399 |
| 2004/0210377 | A1 * | 10/2004 | Cullen | ........................ | 701/102 |
| 2005/0065705 | A1 * | 3/2005 | Hartmann et al. | ........... | 701/102 |
| 2005/0274357 | A1 * | 12/2005 | Matthews et al. | ........... | 123/350 |

* cited by examiner

*Primary Examiner*—Stephen K Cronin
*Assistant Examiner*—David Hamaoui

(57) ABSTRACT

An engine control system includes a power module, an air flow module, a torque estimation module, and an air control module. The power module determines a power-based torque based on a desired engine speed. The air flow module determines an air flow value based on the power-based torque. The torque estimation module estimates a desired torque based on the air flow value. The air control module selectively determines a throttle area based on the desired torque. A throttle valve is actuated based on the throttle area.

20 Claims, 4 Drawing Sheets

SPEED CONTROL IN A TORQUE-BASED SYSTEM

CROSS-REFERENCE TO RELATED APPLICATIONS

This application claims the benefit of U.S. Provisional Application No. 61/019,945, filed on Jan. 9, 2008. The disclosure of the above application is incorporated herein by reference in its entirety.

FIELD

The present disclosure relates to engine speed control and more particularly to engine speed control in a torque-based system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gas engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque. Traditional engine control systems, however, do not control the engine torque output as accurately as desired. Further, traditional engine control systems do not provide as rapid of a response to control signals as is desired or coordinate engine torque control among various devices that affect the engine torque output.

SUMMARY

An engine control system includes a power module, an air flow module, a torque estimation module, and an air control module. The power module determines a power-based torque based on a desired engine speed. The air flow module determines an air flow value based on the power-based torque. The torque estimation module estimates a desired torque based on the air flow value. The air control module selectively determines a throttle area based on the desired torque. A throttle valve is actuated based on the throttle area.

A method includes determining a power-based torque based on a desired engine speed; determining an air flow value based on the power-based torque; estimating a desired torque based on the air flow value; selectively determining a throttle area based on the desired torque; and actuating a throttle valve based on the throttle area.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
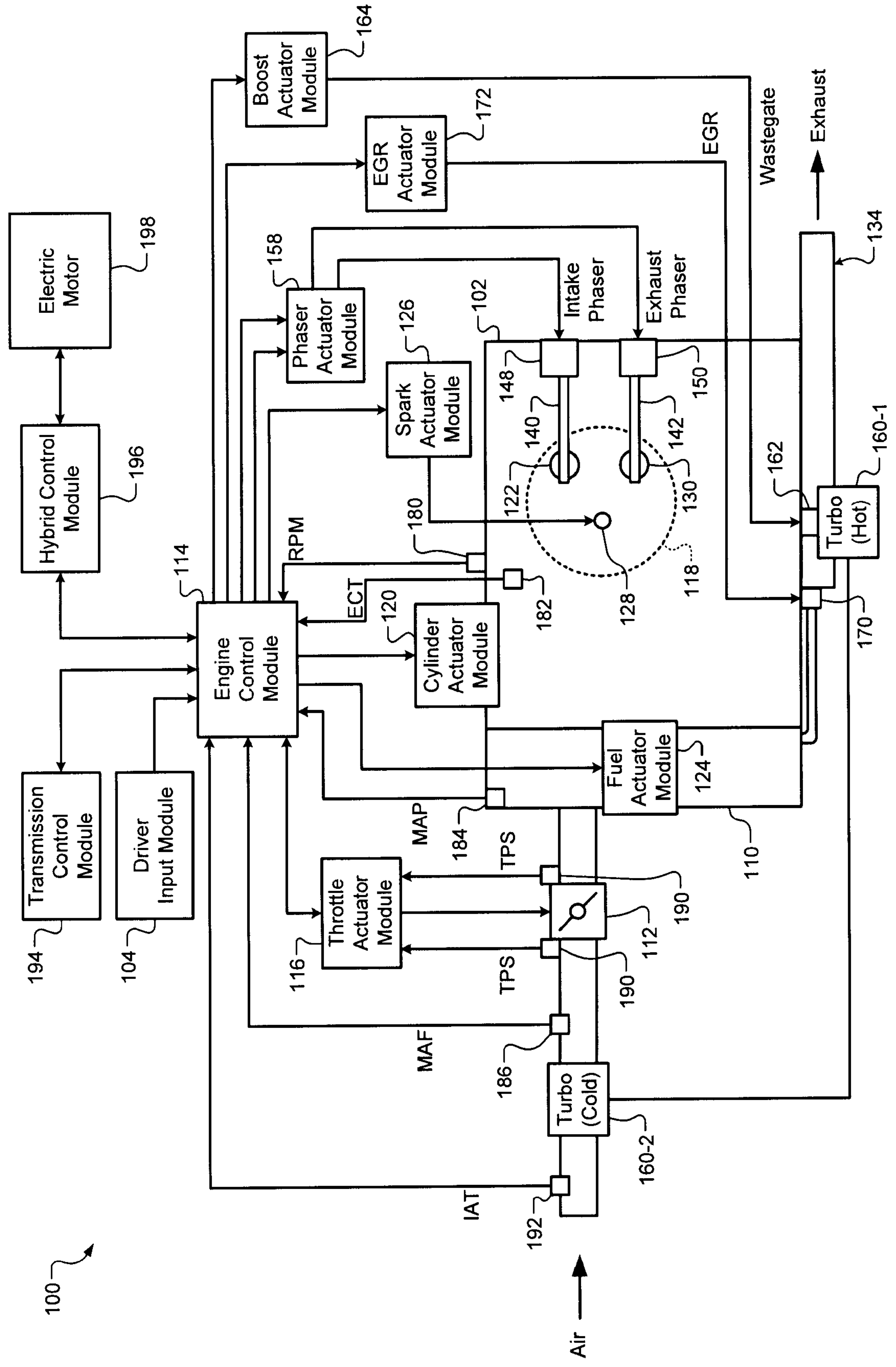
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Power is a natural domain for controlling an engine to maintain a desired speed. Operating the engine at the desired speed may require a certain amount of power, which is equal to the product of torque and the desired speed. Assuming that the load on the engine does not change, and therefore that the same amount of power will be needed, a decrease in speed would lead to an increase in torque to maintain the same power. Similarly, if the engine speed increases, less torque will be generated to maintain the same power.

Figure 2:
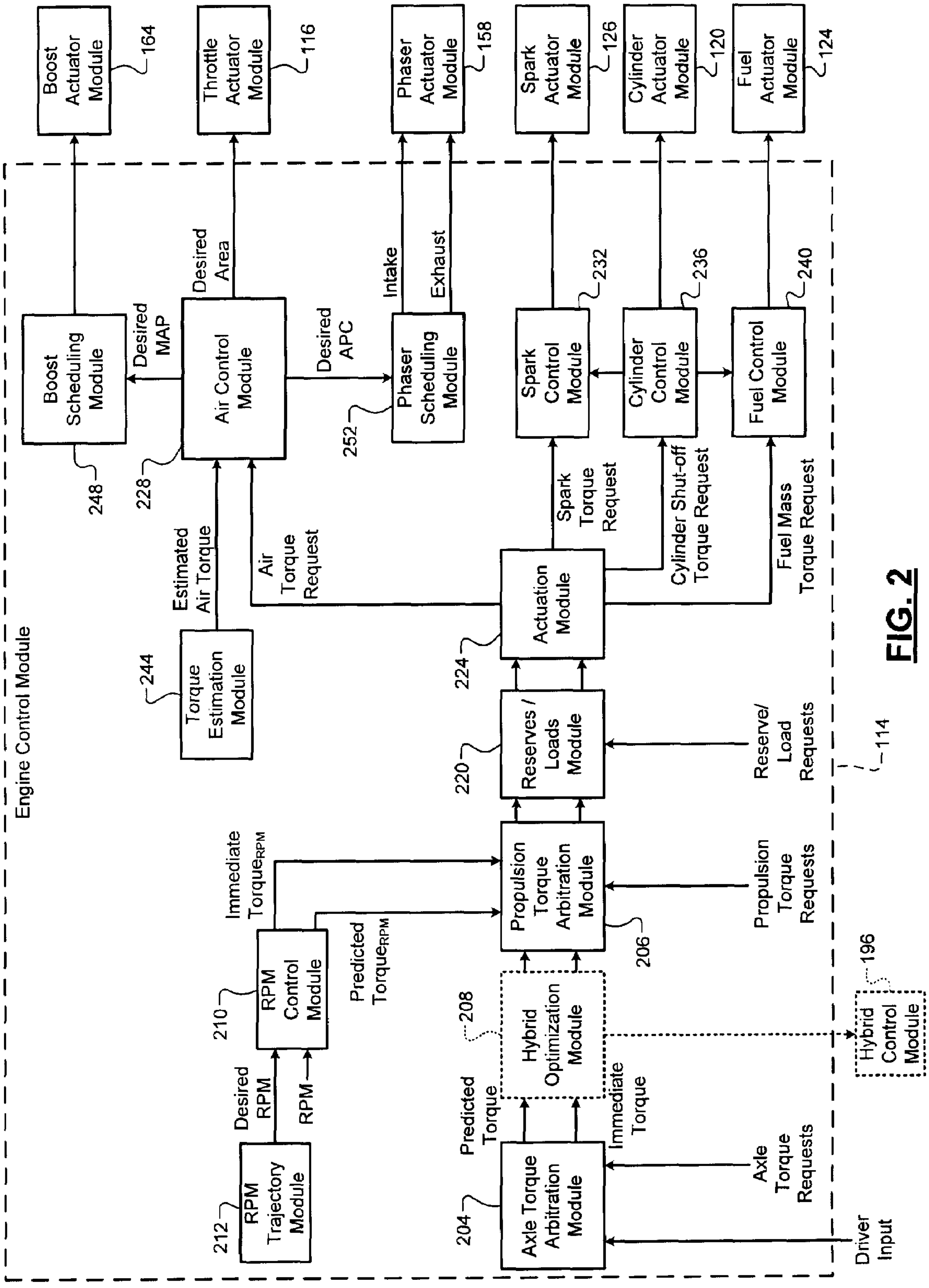
FIG. 2 is a functional block diagram of an exemplary engine control system according to the principles of the present disclosure.

FIGS. 1-2 depict an engine system where engine control is performed in a torque domain. A power-based torque value may therefore be determined in order to control the engine to a desired speed. The power-based torque value may be a brake torque value. Brake torque (also known as flywheel torque) may be defined as a torque available at the flywheel to power the transmission of the vehicle.

The brake torque may be estimated from a base torque (also known as undressed torque), which can be measured on a dynamometer. When tested on the dynamometer, the engine may be undressed— i.e., without accessory loads, such as air conditioning, alternator/generator, or power steering. In addition, the base torque may be measured when the engine is hot (above a threshold temperature), which may decrease the amount of torque lost to friction.

A cylinder torque may be defined as the amount of torque generated by the cylinders. The base torque may therefore be equal to the cylinder torque minus the friction of the engine while hot and the pumping losses of the engine. Pumping losses may include the torque absorbed in pumping air into and out of the cylinders of the engine.

The brake torque may be estimated by subtracting cold friction and accessory loads from the base torque. The cold friction value may be the additional torque lost when the engine is cold (less than the threshold temperature) compared to when the engine is hot.

Figure 3:
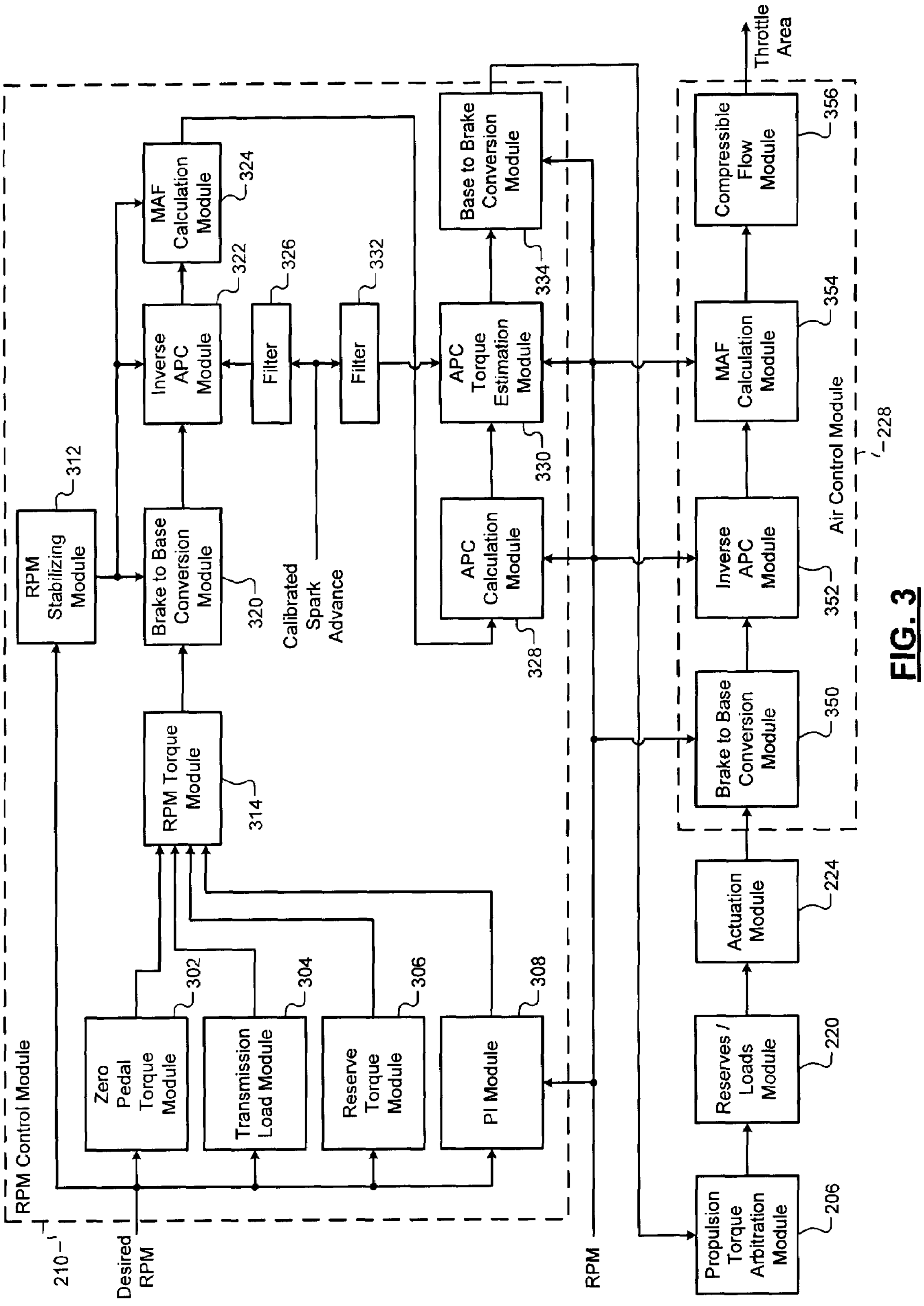
FIG. 3 is a functional block diagram of exemplary implementations of an RPM control module and a predicted torque control module according to the principles of the present disclosure.

As shown in FIG. 3, the power-based torque, which was calculated to achieve the desired speed, may be converted from a brake torque to a base torque. A desired air flow that will generate this base torque at the desired speed can then be determined. A desired torque can be determined based on the desired air flow and the current engine speed. In this way, the power-based torque (as expressed by the desired torque) can be arbitrated in the torque domain in a torque-based system, such as that shown in FIGS. 1 and 2.

This desired torque is then arbitrated with other torque requests (such as from engine over-speed protection or transmission control) to determine an arbitrated torque. The arbitrated torque is then converted into a control air flow based on the current engine speed. The engine is then controlled to produce the control air flow.

Referring back to FIG. 1, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A wastegate 162 may allow exhaust gas to bypass the turbocharger 160, thereby reducing the boost (the amount of intake air compression) of the turbocharger 160. The ECM 114 controls the turbocharger 160 via a boost actuator module 164. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

Referring now to FIG. 2, a functional block diagram of an exemplary engine control system is presented. An exemplary implementation of the ECM 114 includes an axle torque arbitration module 204. The axle torque arbitration module 204 arbitrates between a driver input from the driver input module 104 and other axle torque requests. For example, the driver input may be based on position of an accelerator pedal. The driver input may also be based on cruise control, which may be an adaptive cruise control system that varies vehicle speed to maintain a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems. Axle torque requests may further include engine shutoff requests, such as may be generated when a critical fault is detected.

The axle torque arbitration module 204 outputs a predicted torque and an immediate torque based on the results of arbitrating between the received torque requests. The predicted torque is the amount of torque that the ECM 114 prepares the engine 102 to generate, and may often be based on the driver's torque request. The immediate torque is the amount of currently desired torque, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque may be achieved by varying engine actuators that respond quickly, while slower engine actuators may be used to prepare for the predicted torque. For example, in a gas engine, spark advance may be adjusted quickly, while air flow and cam phaser position may be slower to respond because of mechanical lag time. Further, changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, the throttle valve 112 can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The axle torque arbitration module 204 may output the predicted torque and the immediate torque to a propulsion torque arbitration module 206. In various implementations, the axle torque arbitration module 204 may output the predicted torque and immediate torque to a hybrid optimization module 208. The hybrid optimization module 208 determines how much torque should be produced by the engine 102 and how much torque should be produced by the electric motor 198. The hybrid optimization module 208 then outputs modified predicted and immediate torque values to the propulsion torque arbitration module 206. In various implementations, the hybrid optimization module 208 may be implemented in the hybrid control module 196.

The predicted and immediate torques received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torques. The propulsion torque arbitration module 206 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine. The propulsion torque arbitration module 206 may still receive these shutoff requests so that, for example, appropriate data can be fed back to other torque requesters. For example, all other torque requesters may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque requested by the axle torque arbitration module 204 is less than a calibratable torque value.

The RPM control module 210 receives a desired RPM from an RPM trajectory module 212, and controls the predicted and immediate torque requests to reduce the difference between the desired RPM and the actual RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. Various engine operating conditions may affect the engine torque output. In response to these conditions, the reserves/loads module 220 may create a torque reserve by increasing the predicted torque request.

For example only, a catalyst light-off process or a cold start emissions reduction process may directly vary spark advance for an engine. The reserves/loads module 220 may therefore increase the predicted torque request to counteract the effect of that spark advance on the engine torque output. In another example, the air/fuel ratio of the engine and/or the mass air flow may be directly varied, such as by diagnostic intrusive equivalence ratio testing and/or new engine purging. Corresponding predicted torque requests may be made to offset changes in the engine torque output during these processes.

The reserves/loads module 220 may also create a reserve in anticipation of a future load, such as the engagement of the air conditioning compressor clutch or power steering pump operation. The reserve for air conditioning (A/C) clutch engagement may be created when the driver first requests air conditioning. Then, when the A/C clutch engages, the reserves/loads module 220 may add the expected load of the A/C clutch to the immediate torque request.

An actuation module 224 receives the predicted and immediate torque requests from the reserves/loads module 220. The actuation module 224 determines how the predicted and immediate torque requests will be achieved. The actuation module 224 may be engine type specific, with different control schemes for gas engines versus diesel engines. In various implementations, the actuation module 224 may define the boundary between modules prior to the actuation module 224, which are engine independent, and modules that are engine dependent.

For example, in a gas engine, the actuation module 224 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 224 may generate an air torque request based on the predicted torque request. The air torque request may be equal to the predicted torque request, causing air flow to be set so that the predicted torque request can be achieved by changes to other actuators.

An air control module 228 may determine desired actuator values for slow actuators based on the air torque request. For example, the air control module 228 may control desired manifold absolute pressure (MAP), desired throttle area, and*/or desired air per cylinder (APC). Desired MAP may be used to determine desired boost, and desired APC may be used to determine desired cam phaser positions. In various implementations, the air control module 228 may also determine an amount of opening of the EGR valve 170.

In gas systems, the actuation module 224 may also generate a spark torque request, a cylinder shut-off torque request, and a fuel mass torque request. The spark torque request may be used by a spark control module 232 to determine how much to retard the spark (which reduces the engine torque output) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly. The cylinder control module 236 may also instruct a fuel control module 240 to stop providing fuel for deactivated cylinders and may instruct the spark control module 232 to stop providing spark for deactivated cylinders.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel mass torque request may be used by the fuel control module 240 to vary the amount of fuel provided to each cylinder. For example only, the fuel control module 240 may determine a fuel mass that, when combined with the current amount of air per cylinder, yields stoichiometric combustion. The fuel control module 240 may instruct the fuel actuator module 124 to inject this fuel mass for each activated cylinder. During normal engine operation, the fuel control module 240 may attempt to maintain a stoichiometric air/fuel ratio.

The fuel control module 240 may increase the fuel mass above the stoichiometric value to increase engine torque output and may decrease the fuel mass to decrease engine torque output. In various implementations, the fuel control module 240 may receive a desired air/fuel ratio that differs from stoichiometry. The fuel control module 240 may then determine a fuel mass for each cylinder that achieves the desired air/fuel ratio. In diesel systems, fuel mass may be the primary actuator for controlling engine torque output.

The approach the actuation module 224 takes in achieving the immediate torque request may be determined by a mode setting. The mode setting may be provided to the actuation module 224, such as by the propulsion torque arbitration module 206, and may select modes including an inactive mode, a pleasable mode, a maximum range mode, and an auto actuation mode.

In the inactive mode, the actuation module 224 may ignore the immediate torque request and attempt to achieve the predicted torque request. The actuation module 224 may therefore set the spark torque request, the cylinder shut-off torque request, and the fuel mass torque request to the predicted torque request, which maximizes torque output for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasable mode, the actuation module 224 may attempt to achieve the immediate torque request by adjusting only spark advance. The actuation module 224 may therefore output the predicted torque request as the air torque request and the immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved.

In the maximum range mode, the actuation module 224 may output the predicted torque request as the air torque request and the immediate torque request as the spark torque request. In addition, the actuation module 224 may generate a cylinder shut-off torque request that is low enough to enable the spark control module 232 to achieve the immediate torque request. In other words, the actuation module 224 may decrease the cylinder shut-off torque request (thereby deactivating cylinders) when reducing spark advance alone is unable to achieve the immediate torque request.

In the auto actuation mode, the actuation module 224 may decrease the air torque request based on the immediate torque request. For example, the air torque request may be reduced only so far as is necessary to allow the spark control module 232 to achieve the immediate torque request by adjusting spark advance. Therefore, in auto actuation mode, the immediate torque request is achieved while allowing the engine 102 to return to the predicted torque request as quickly as possible. In other words, the use of relatively slowly-responding throttle valve corrections is minimized by reducing the quickly-responding spark advance as much as possible.

A torque estimation module 244 may estimate torque output of the engine 102. This estimated torque may be used by the air control module 228 to perform closed-loop control of engine air flow parameters, such as MAP, throttle area, and phaser positions. For example only, a torque relationship such as $$T=f(APC,S,I,E,AF,OT,\#) \tag{1}$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions. In addition, a calibrated spark advance value may be used. This estimated torque may be referred to as an air torque—i.e., an estimate of how much torque could be generated at the current air flow, regardless of the actual engine torque output, which varies based on spark advance.

The air control module 228 may generate a desired manifold absolute pressure (MAP) signal, which is output to a boost scheduling module 248. The boost scheduling module 248 uses the desired MAP signal to control the boost actuator module 164. The boost actuator module 164 then controls one or more turbochargers and/or superchargers.

The air control module 228 may generate a desired area signal, which is output to the throttle actuator module 116. The throttle actuator module 116 then regulates the throttle valve 112 to produce the desired throttle area. The air control module 228 may use the estimated torque and/or the MAF signal in order to perform closed loop control. For example, the desired area signal may be controlled based on a comparison of the estimated torque and the air torque request.

The air control module 228 may also generate a desired air per cylinder (APC) signal, which is output to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, spark advance values may be calibrated at various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},APC,I,E,AF,OT,\#). \tag{2}$$

This relationship may be embodied as an equation and/or as a lookup table. The air/fuel ratio (AF) may be the actual ratio, as indicated by the fuel control module 240.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT.

Referring now to FIG. 3, a functional block diagram of exemplary implementations of the RPM control module 210 and the air control module 228 are presented. The RPM control module 210 receives the desired RPM signal from the RPM trajectory module 212. The desired RPM signal may be received by a zero pedal torque module 302, a transmission load module 304, a reserve torque module 306, a proportional-integral (PI) module 308, and an RPM stabilizing module 312. The zero pedal torque module 302 determines the torque the engine should produce when the driver is applying less than a predetermined pressure to the accelerator pedal.

The transmission load module 304 determines the load the transmission puts on the engine. For example, this may be based on the engine speed as well as vehicle wheel speed. The reserve torque module 306 determines the amount of reserve torque that the engine should have available for events such as power steering assistance and air conditioning compressor turn-on.

The PI module 308 generates a proportional term and an integral term based on a difference between the desired RPM and the actual RPM. In various implementations, the proportional term may be equal to a proportional constant times the difference. In various implementations, the integral term may be an integral constant times an integral with respect to time of the difference. The output of the PI module 308 may be the sum of the proportional and integral terms.

An RPM torque module 314 receives the outputs of the zero pedal torque module 302, the transmission load module 304, the reserve torque module 306, and the PI module 308. The RPM torque module 314 determines a desired power-based torque that will enable the engine to run at the desired RPM. In various implementations, the RPM torque module 314 may sum the values received. In various implementations, the reserve torque module 306 may be omitted, and its functionality may be replaced by the reserves/loads module 220.

The RPM torque module 314 outputs the desired power-based torque to a brake to base conversion module 320. For example only, the brake to base conversion module 320 may add a torque offset based on cold friction and accessory loads to the desired power-based torque. The cold friction portion of the torque offset may be based on engine temperature, which may be estimated from engine coolant temperature, and may diminish to zero when the engine temperature reaches a predetermined level.

The brake to base conversion module 320 may perform the brake to base conversion based on a stabilized RPM from the RPM stabilizing module 312. In various implementations, the RPM stabilizing module 312 may generate the stabilized RPM by applying a low-pass filter to the desired RPM. The stabilized RPM may also be output to an inverse air per cylinder (APC) module 322 and a mass air flow (MAF) calculation module 324.

The inverse APC module 322 uses an inverse torque model to determine the APC necessary to produce the base torque request received from the brake to base conversion module 320. The inverse torque model also uses the stabilized RPM and a filtered spark advance received from a first filter module 326. The first filter module 326 receives a spark advance value that is calibrated for current engine operating conditions and applies a filter, such as a low-pass filter, to that spark advance value.

The inverse torque model may be represented as:

$$APC_{des}=T^{-1}(T_{des},S,I,E,AF,OT,\#), \quad (3)$$

The APC value determined by the inverse APC module 322 is output to the MAF calculation module 324. The MAF calculation module 324 converts the APC into a MAF by using the following equation:

$$MAF_{des} = \frac{APC_{des} \cdot RPM \cdot \#}{60\ \text{s/min} \cdot 2rev/\text{firing}}, \quad (4)$$

where # is the number of cylinders currently being fueled and RPM is the stabilized desired RPM from the RPM stabilizing module 312.

The MAF value calculated by the MAF calculation module 324 is the desired air flow corresponding to the power-based torque. The desired air flow is converted back to an APC value by an APC calculation module 328, this time using the current RPM of the engine. The resulting APC value is used by an APC torque estimation module 330 to estimate the engine torque produced with that APC value. The APC torque estimation module 330 estimates this torque based on the current RPM and the calibrated spark value as filtered by a second filter module 332.

If the estimated torque is a base torque, the estimated torque may be converted to a brake torque by a base to brake conversion module 334 based on the current RPM. The output from the base to brake conversion module 334 is the torque request from the RPM control module 210 to the propulsion torque arbitration module 206.

As described above, the propulsion torque arbitration module 206 arbitrates between the torque request from the RPM control module 210 and other propulsion torque requests. The result of arbitration is acted on by the reserves/loads module 220 and the actuation module 224. The actuation module 224 outputs an air torque request to the air control module 228.

The air control module 228 includes a brake to base conversion module 350 that converts the air torque request to a base torque, which may be performed based on current RPM. The base torque is output to an inverse APC module 352, which determines an APC value that will allow the engine to produce the received base torque. The APC value is converted to a MAF value by a MAF calculation module 354 based on the current RPM.

A compressible flow module 356 determines a throttle area based on the MAF value. The compressible flow module 356 may use the following equation:

$$Area_{des} = \frac{MAF_{des} \cdot \sqrt{R_{gas} \cdot T}}{P_{baro} \cdot \Phi(P_r)}, \text{ where } P_r = \frac{MAP_{des}}{P_{baro}}, \quad (5)$$

where $R_{gas}$ is the ideal gas constant, T is intake air temperature, $MAP_{des}$ is desired manifold absolute pressure (MAP), and $P_{baro}$ is barometric pressure. $P_{baro}$ may be directly measured using a sensor, such as the IAT sensor 192, or may be calculated using other measured or estimated parameters. In various implementations, $MAP_{des}$ may be replaced by current MAP.

The Φ function may account for changes in air flow due to pressure differences on either side of the throttle valve 112. The Φ function may be specified as follows:

$$\Phi(P_r) = \begin{cases} \sqrt{\frac{2\gamma}{\gamma-1}\left(1-P_r^{\frac{\gamma-1}{\gamma}}\right)} & \text{if } P_r > P_{critical} \\ \sqrt{\gamma\left(\frac{2}{\gamma+1}\right)^{\frac{\gamma+1}{\gamma-1}}} & \text{if } P_r \le P_{critical} \end{cases}, \text{ where} \tag{6}$$

$$P_{critical} = \left(\frac{2}{\gamma+1}\right)^{\frac{\gamma}{\gamma-1}} = 0.528 \text{ for air,} \tag{7}$$

and where γ is a specific heat constant that is between approximately 1.3 and 1.4 for air. $P_{critical}$ is defined as the pressure ratio at which the velocity of the air flowing past the throttle valve 112 equals the velocity of sound, which is referred to as choked or critical flow. The compressible flow module 356 outputs the desired area to the throttle actuator module 116, which controls the throttle valve 112 to provide the desired opening area.

Figure 4:
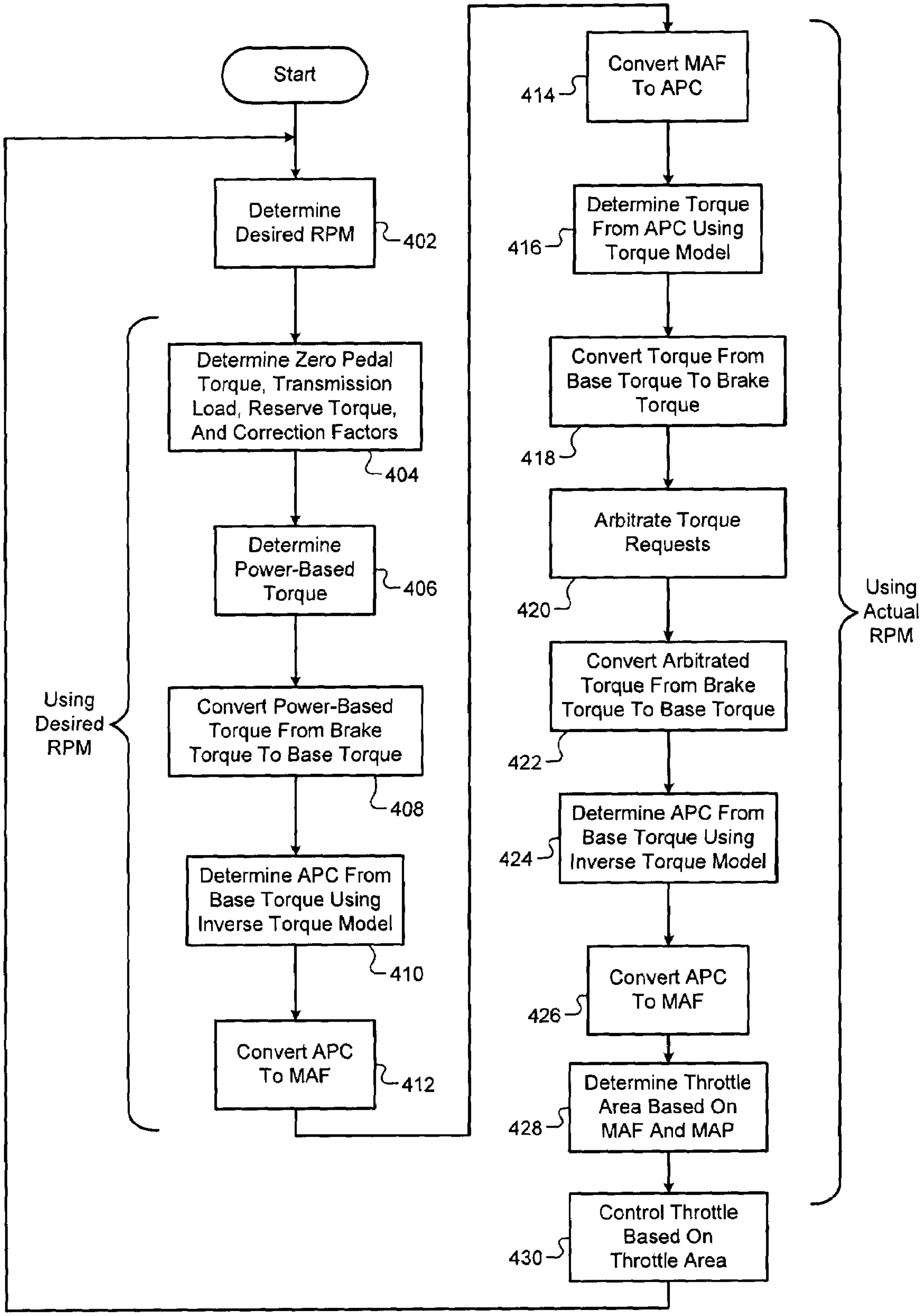
FIG. 4 is a flowchart depicting exemplary steps performed by the engine control module according to the principles of the present disclosure.

Referring now to FIG. 4, a flowchart depicts exemplary steps performed in controlling throttle area when in RPM mode. In various implementations, RPM mode may be entered when the torque requested by the driver is less than a predetermined value for a calibratable amount of time. In other words, RPM mode may be selected when the driver is applying less than a specified pressure to the pedal for a calibratable amount of time. In addition, RPM mode may be selected when the engine is starting.

Control begins in step 402, where the desired RPM is determined. Control then continues in step 404. For steps 404 through 412, the desired RPM may be used to perform the calculations. In step 404, zero pedal torque, transmission load, reserve torque, and RPM error correction factors are determined. Control continues in step 406, where a desired power-based torque is determined based upon a sum of the values calculated in step 404.

Control continues in step 408, where the desired power-based torque is converted from a brake torque to a base torque. Control continues in step 410, where an APC value is determined from the base torque using an inverse torque model. Control continues in step 412, where the APC value is converted to a MAF value.

Control continues in step 414, where the MAF value is converted back to an APC value. However, in steps 414 through 428, calculations may be based on the engine's current RPM. Because the desired RPM and the current RPM may differ, steps 412 and 414 may not simply cancel each other out.

Control continues in step 416, where the torque produced by the APC calculated in step 414 is determined. Control continues in step 418, where the torque is converted from a base torque to a brake torque request. Control continues in step 420, where torque requests, including the torque request calculated in step 418, are arbitrated. In RPM mode, the torque request calculated in step 418 may be chosen as the arbitrated torque, while other torque requests are ignored.

Control continues in step 422, where the arbitrated torque is converted from a brake torque to a base torque. Control continues in step 424, where an APC value that will allow that base torque to be produced is determined using an inverse torque model and the current engine speed. Control continues in step 426, where the APC value is converted to a MAF value. Control continues in step 428, where a desired throttle area is determined based upon the MAF value and a MAP value. Control continues in step 430, where control controls the throttle valve 112 to achieve the throttle area. Control then returns to step 402.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:

an engine speed module that determines a desired engine speed;

a power module that determines a power-based torque based on the desired engine speed;

an air flow module that determines an air flow value based on the power-based torque, wherein the air flow value represents an amount of air per combustion event;

a torque estimation module that estimates a desired torque based on the air flow value and a current engine speed; and an air control module that selectively determines a throttle area based on the desired torque, wherein a throttle valve is actuated based on the throttle area.

2. The engine control system of claim 1 wherein the air control module determines the throttle area based on the desired torque when a driver accelerator input is below a predetermined value for a predetermined period of time.

3. The engine control system of claim 1 wherein the power module determines the power-based torque based on a first torque, wherein the first torque is determined using a torque model and the desired engine speed.

4. The engine control system of claim 3 wherein the power module determines the power-based torque further based on second and third torques, wherein the second torque is based on a difference between the desired engine speed and the current engine speed, and wherein the third torque is based on a transmission load at the desired engine speed.

5. The engine control system of claim 4 wherein the power module determines the power-based torque based on a sum of the first, second, and third torques.

6. The engine control system of claim 5 wherein the power module determines the power-based torque based on a sum of a fourth torque and the first, second, and third torques, wherein the fourth torque is based on a torque reserve.

7. The engine control system of claim 1 wherein the air flow module determines the air flow value based on the desired engine speed, and the air control module determines the throttle area based on the current engine speed.

8. The engine control system of claim 7 further comprising:

a first conversion module that generates a first base torque based on a sum of the power-based torque, a first load torque, and a first frictional loss torque, wherein the first frictional loss torque is based on the desired engine speed; and an inverse torque module that determines an air value corresponding to the first base torque based on an inverse torque model and the desired engine speed, wherein the air flow module determines the air flow value based on the air value.

9. The engine control system of claim 8 further comprising:

a second conversion module that generates a requested torque based on a difference between the desired torque and an offset torque, wherein the offset torque is based on a second load torque and a second frictional loss torque, and wherein the second frictional loss torque is based on the current engine speed; and an arbitration module that generates an arbitrated torque, wherein the arbitrated torque is selectively based on the requested torque, and wherein the air control module determines the throttle area based on the arbitrated torque.

10. The engine control system of claim 1 wherein the air control module determines a desired air value corresponding to the desired torque based on an inverse torque model and determines the throttle area based on the desired air value.

11. A method of operating an engine, comprising:

determining a desired engine speed;

determining a power-based torque based on the desired engine speed;

determining an air flow value based on the power-based torque, wherein the air flow value represents an amount of air per combustion event;

estimating a desired torque based on the air flow value and a current engine speed; and selectively determining a throttle area based on the desired torque; and actuating a throttle valve based on the throttle area.

12. The method of claim 11 further comprising determining the throttle area based on the desired torque when a driver accelerator input is below a predetermined value for a predetermined period of time.

13. The method of claim 11 further comprising:

determining a first torque using a torque model and the desired engine speed; and determining the power-based torque based on the first torque.

14. The method of claim 13 further comprising:

determining a second torque based on a difference between the desired engine speed and the current engine speed;

determining a third torque based on a transmission load at the desired engine speed; and determining the power-based torque based on the first, second, and third torques.

15. The method of claim 14 further comprising determining the power-based torque based on a sum of the first, second, and third torques.

16. The method of claim 15 further comprising:

determining a fourth torque based on a torque reserve; and determining the power-based torque based on a sum of the first, second, third, and fourth torques.

17. The method of claim 11 further comprising:

determining the air flow value based on the desired engine speed; and determining the throttle area based on the current engine speed.

18. The method of claim 17 further comprising:

determining a first frictional loss torque based on the desired engine speed;

generating a first base torque based on a sum of the power-based torque, the first frictional loss torque, and a first load torque;

determining an air value corresponding to the first base torque based on an inverse torque model and the desired engine speed; and determining the air flow value based on the air value.

19. The method of claim 18 further comprising:

determining a second frictional loss torque based on the current engine speed;

determining an offset torque based on a second load torque and the second frictional loss torque;

generating a requested torque based on a difference between the desired torque and the offset torque;

generating an arbitrated torque, wherein the arbitrated torque is selectively based on the requested torque; and determining the throttle area based on the arbitrated torque.

20. The method of claim 11 further comprising:

determining a desired air value corresponding to the desired torque based on an inverse torque model; and determining the throttle area based on the desired air value.

* * * * *